(12) United States Patent
Kumagai

(10) Patent No.: US 10,432,050 B2
(45) Date of Patent: Oct. 1, 2019

(54) MOTOR ROTOR, AND COMPRESSOR MOTOR AND COMPRESSOR INCORPORATED WITH THE MOTOR ROTOR

(71) Applicant: Mitsubishi Electric Corporation, Tokyo (JP)

(72) Inventor: Kazuya Kumagai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 247 days.

(21) Appl. No.: 15/529,159

(22) PCT Filed: Mar. 9, 2015

(86) PCT No.: PCT/JP2015/056870
§ 371 (c)(1),
(2) Date: May 24, 2017

(87) PCT Pub. No.: WO2016/143047
PCT Pub. Date: Sep. 15, 2016

(65) Prior Publication Data
US 2018/0048202 A1    Feb. 15, 2018

(51) Int. Cl.
*H02K 1/32* (2006.01)
*H02K 9/19* (2006.01)
*H02K 1/27* (2006.01)

(52) U.S. Cl.
CPC ................ *H02K 1/32* (2013.01); *H02K 1/27* (2013.01); *H02K 1/276* (2013.01); *H02K 9/19* (2013.01)

(58) Field of Classification Search
CPC ............ H02K 1/32; H02K 9/19; H02K 9/193; H02K 1/27; H02K 1/276
(Continued)

(56) References Cited

U.S. PATENT DOCUMENTS 9,300,189 B2 *   3/2016   Hautz ...................... H02K 1/32
9,985,500 B2 *   5/2018   Rippel ..................... H02K 9/19
(Continued)

FOREIGN PATENT DOCUMENTS

JP    S63-181644 A    7/1988
JP    H11-018339 A    1/1999
(Continued)

OTHER PUBLICATIONS

International Search Report of the International Searching Authority dated May 26, 2015 for the corresponding International application No. PCT/JP2015/056870 (and English translation).
(Continued)

*Primary Examiner* — Jeremy A Luks
(74) *Attorney, Agent, or Firm* — Posz Law Group, PLC

(57) ABSTRACT

A motor rotor includes a rotor core having a plurality of magnet insertion holes in each of which a permanent magnet is inserted, a flow path formed on a radially inner side of the plurality of magnet insertion holes to allow a fluid to flow through, and a shaft insertion hole in which a rotary shaft is inserted, and the permanent magnet inserted in each of the plurality of magnet insertion holes of the rotor core. The rotor core has an inlet opening and an outlet opening each opened in a corresponding one of end faces of the rotor core in an axial direction, and a communication hole circumferentially extending inside the rotor core and communicating with the inlet opening and the outlet opening.

11 Claims, 12 Drawing Sheets

(58) Field of Classification Search
USPC .............................................. 310/58, 59, 61
See application file for complete search history.

(56) References Cited

U.S. PATENT DOCUMENTS

| | | | |
|---|---|---|---|
| 10,128,704 B2* | 11/2018 | Okochi | ................ H02K 1/2766 |
| 2004/0134693 A1 | 7/2004 | Yamagishi et al. | |
| 2014/0333163 A1* | 11/2014 | Horii | ........................ H02K 1/20 |
| | | | 310/59 |
| 2016/0261169 A1* | 9/2016 | Rawlinson | ............... H02K 9/06 |

FOREIGN PATENT DOCUMENTS

| | | |
|---|---|---|
| JP | 2001-016826 A | 1/2001 |
| JP | 2004-129407 A | 4/2004 |
| JP | 2004-166492 A | 6/2004 |
| JP | 2006-166543 A | 6/2006 |
| JP | 2008-178233 A | 7/2008 |
| JP | 2008-187778 A | 8/2008 |
| JP | 2011-254576 A | 12/2011 |
| JP | 2014-138543 A | 7/2014 |

OTHER PUBLICATIONS

Office Action dated Feb. 27, 2018 issued in corresponding JP patent application No. 2017-504469 (and English translation attached).
Office Action dated Dec. 11, 2017 issued in corresponding CN patent application No. 201610094831.9 (and English translation attached).

* cited by examiner

MOTOR ROTOR, AND COMPRESSOR MOTOR AND COMPRESSOR INCORPORATED WITH THE MOTOR ROTOR

CROSS REFERENCE TO RELATED APPLICATION

This application is a U.S. national stage application of International Application No. PCT/JP2015/056870, filed on Mar. 9, 2015, the contents of which are incorporated herein by reference.

TECHNICAL FIELD

The present invention relates to a motor rotor with built-in permanent magnets for use in a sealed compressor, and to a compressor motor and a compressor incorporated with the motor rotor.

BACKGROUND

A motor with built-in permanent magnets is widely known as an electromotive element of a sealed compressor. The motor with built-in permanent magnets includes a stator fixed to a sealed container, a rotor located inside the stator, including a plurality of electromagnetic steel plates stacked on each other, and in which permanent magnets are inserted, and a rotary shaft fixed to the rotor and connected to a compression element. When a current is applied to the stator, a rotating magnetic field is generated by the stator. The rotor rotates owing to attracting and repelling action between the rotating magnetic field and the permanent magnet of the rotor, and thus a crank shaft fixed to the rotor is caused to rotate. Consequenity, the compression element of the compressor connected to an eccentric shaft portion of the crank shaft compresses refrigerant.

The refrigerant in the compressor is sucked through a suction port and compressed by the compression element, and then passes through a gap between the motor, which is the electromotive element, and the shell, or a refrigerant flow path provided in the stator, and is discharged through a discharge port. In addition, a refrigerant flow path may also be formed in the rotor, to allow the refrigerant to flow through in the axial direction. The refrigerant flow path formed in the rotor not only serves as a route for the compressed refrigerant to proceed to the discharge port of the compressor, but also serves to cool the motor rotor in the compressor, which generates heat during the operation. More specifically, the rotor generates heat owing to eddy current on the magnet surface generated when the rotating magnetic field interlinks with the permanent magnet. In addition, the magnetic flux amount and demagnetization resistance of the permanent magnet is dependent on temperature, and the demagnetization resistance decreases as the temperature increases. To solve the problem, techniques to improve the heat dissipation performance of the rotor by causing the refrigerant to flow through the rotor have been proposed (see, for example, Patent Literatures 1 and 2).

Patent Literature 1 discloses a rotor in which the end openings of the refrigerant flow path in the axial direction are formed with a phase difference in a positive direction and a negative direction, to improve the cooling effect of the refrigerant flow path to cool the rotor. Electromagnetic steel plates are stacked by a phase difference of 180 degrees to allow the openings shifted in the positive direction and the negative direction to communicate with each other to form projections and recesses on the surface of the flow path. Patent Literature 2 discloses a rotor in which the electromagnetic steel plates include a flow path formed on a radially inner side of the rotor to extend in the axial direction and a flow path extending radially inward from the outer circumference of the rotor, and are stacked by a phase difference to allow the flow path on the radially inner side of the electromagnetic steel plate and the flow path extending radially inward from the outer circumference to communicate with each other.

PATENT LITERATURE

Patent Literature 1: Japanese Unexamined Patent Application Publication No. 2011-254576
Patent Literature 2: Japanese Unexamined Patent Application Publication No. 2014-138543

In the motor rotor according to Patent Literatures 1 and 2, the refrigerant flow paths are formed to generally linearly open through the rotor in the axial direction. However, the flow path of such a shape has a small surface area, and thus a level of heat dissipation performance enabling to prevent or reduce the decline in demagnetization resistance of the permanent magnet is difficult to be attained.

SUMMARY

The present invention has been accomplished in view of the foregoing situation, and provides a motor rotor having an increased flow path to improve the heat dissipation performance, and a compressor motor and a compressor incorporated with such a motor rotor.

A motor rotor according to an embodiment of the present invention includes a rotor core having a plurality of magnet insertion holes in each of which a permanent magnet is inserted, a flow path formed on a radially inner side of the plurality of magnet insertion holes to allow a fluid to flow through, and a shaft insertion hole opened on a radially inner side of the flow path in which a rotary shaft is inserted, and the permanent magnet inserted in each of the plurality of magnet insertion holes of the rotor core. The rotor core has an inlet opening and an outlet opening each opened in a corresponding one of end faces of the rotor core in an axial direction, and a communication hole circumferentially extending inside the rotor core and communicating with the inlet opening and the outlet opening.

The motor rotor according to the embodiment of the present invention includes the flow paths formed inside the rotor to extend in the circumferential direction of the rotary shaft. Consequently, the area of the flow path is increased and the heat dissipation performance is improved, and thus the temperature of the permanent magnet can be decreased.

DETAILED DESCRIPTION

Embodiment 1

Figure 1:
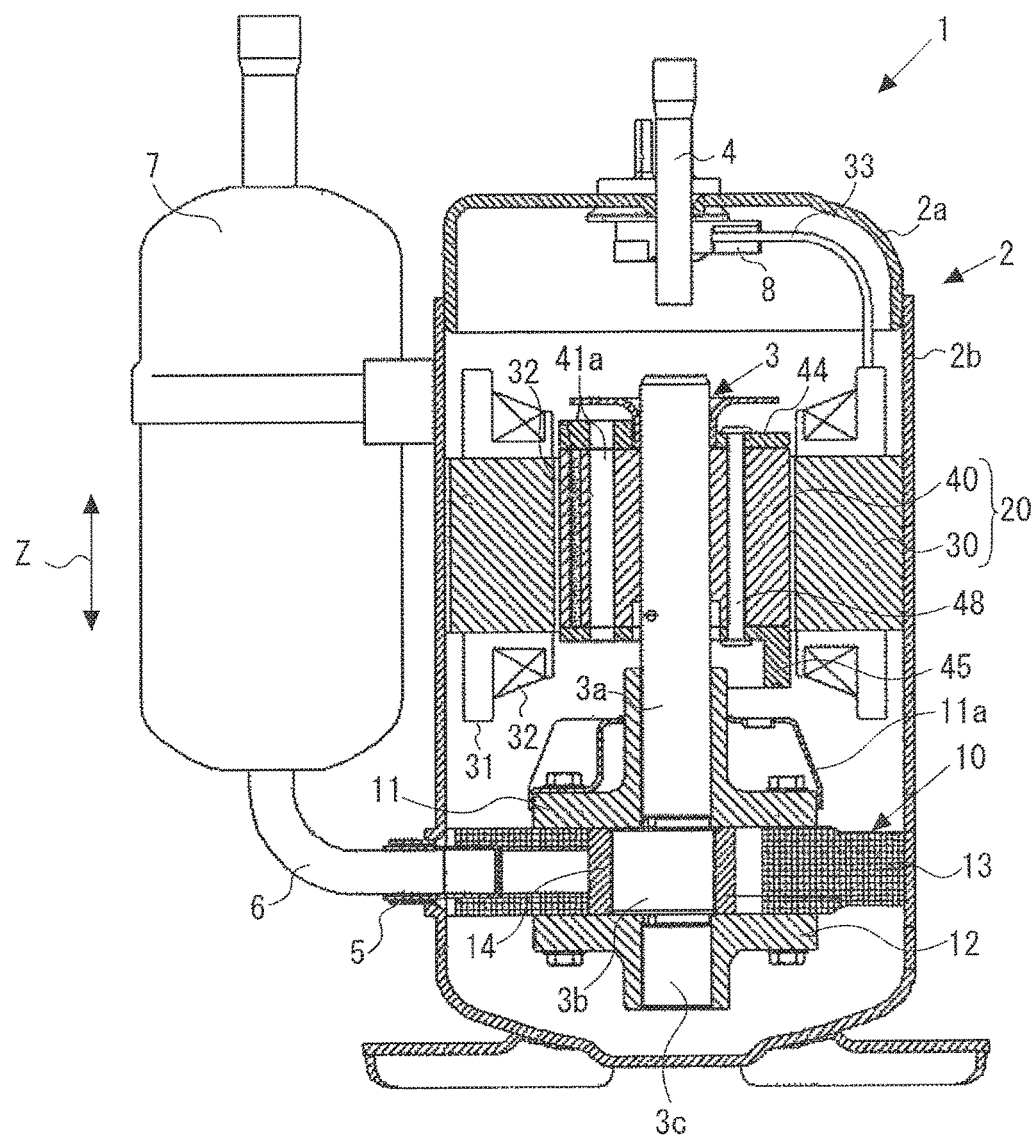
FIG. 1 is a cross-sectional view showing a compressor including a compressor motor according to Embodiment 1 of the present invention.

Hereinafter, Embodiments of a motor rotor according to the present invention, as well as a compressor motor and a compressor incorporated with the motor rotor, will be described with reference to the drawings. FIG. 1 is a cross-sectional view showing a compressor including the compressor motor according to Embodiment 1 of the present invention. A compressor 1 is, for example, a single-cylinder sealed rotary compressor, and includes a sealed container 2, a compression element 10 accommodated in the sealed container 2 and configured to compress refrigerant, a compressor motor 20 accommodated in the sealed container 2 and serving as an electromotive element for driving the compression element 10, and a crank shaft 3 connecting between the compression element 10 and the compressor motor 20.

The sealed container 2 is formed to extend, for example, in an axial direction (direction of an arrow Z), and constituted of an upper container 2a and a lower container 2b. The compression element 10 is located in the lower portion of the sealed container 2, and the compressor motor 20 is located in the upper portion of the sealed container 2 (vertical compressor). The upper container 2a includes a discharge pipe 4 through which the refrigerant compressed by the compression element 10 is discharged. The lower container 2b includes a suction port 5 through which the refrigerant is sucked into the compression element 10, and a suction joint pipe 6 and a suction muffler 7 are connected to the suction port 5. The suction muffler 7 serves as an accumulator for storing liquid refrigerant and also serves to reduce the refrigerant noise. The suction muffler 7 is connected to the compression element 10 via the suction joint pipe 6.

The compression element 10 serves to compress the refrigerant sucked through the suction port 5, and includes a cylinder 11, a main bearing 12, a sub bearing 13, and a rolling piston 14. The cylinder 11 is fixed to the inner wall of the sealed container 2, and a space serving as a compression chamber is provided inside the cylinder 11. The cylinder 11 includes a non-illustrated cylinder groove extending in the radial direction, and a non-illustrated vane is located in the cylinder groove, to radially reciprocate in the cylinder groove. The cylinder 11 also includes an inlet communicating with the suction port 5 and the internal space, and the refrigerant can be sucked into the internal space through the suction port 5.

The main bearing 12 and the sub bearing 13, which rotatably support the crank shaft 3, are fixed to the end portions of the cylinder 11 in the axial direction (direction of the arrow Z) to close the space in the cylinder 11. The crank shaft 3 includes a rotary shaft 3a, an eccentric portion 3b, and a sub shaft portion 3c, and the rotary shaft 3a is fixed to the compressor motor 20. The main bearing 12 rotatably supports the rotary shaft 3a, and the sub bearing 13 rotatably supports the sub shaft portion 3c. The main bearing 12 includes a non-illustrated discharge port through which the compressed refrigerant is discharged, and a discharge muffler 11a is located on the main bearing 12.

The rolling piston 14 is rotatably accommodated in the space inside the cylinder 11, and connected to the eccentric portion 3b of the crank shaft 3. When an end portion of the vane contacts the outer circumference of the rolling piston 14, the compression chamber is formed. The gas refrigerant compressed when the rolling piston 14 is driven is discharged into the sealed container 2 through the cylinder 11, the main bearing 12, and the discharge muffler 11a, and passes through the compressor motor 20, and is then delivered to a refrigeration cycle apparatus through the discharge pipe 4.

The compressor motor 20 is, for example, a brushless DC motor, and includes a stator 30 fixed inside the sealed container 2, and a rotor 40 rotatably located on the radially inner side of the stator 30. A lead wire 33 for supplying power from outside of the sealed container 2 is connected to the stator 30, and to a glass terminal 8 provided in the upper container 2a.

The stator 30 is formed by stacking a plurality of thin electromagnetic steel plates punched into a predetermined shape, and includes a stator core 31 around which a coil 32 is wound. The stator core 31 has an outer diameter larger than the inner diameter of the lower container 2b, and is shrink-fitted in the lower container 2b.

Figure 2:
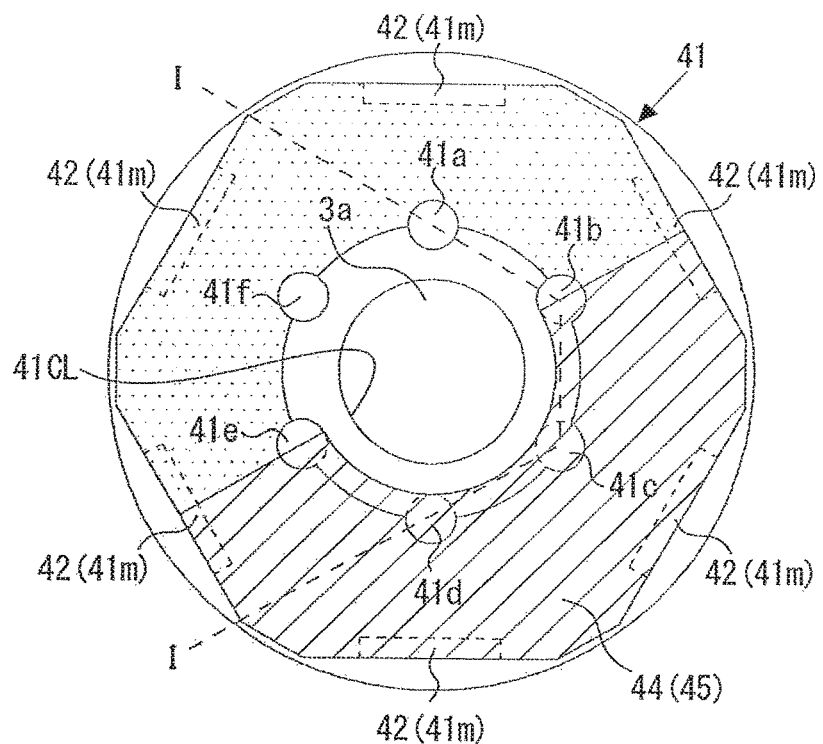
FIG. 2 is a plan view showing an example of a rotor in the compressor motor shown in FIG. 1.

FIG. 2 is a plan view showing an example of a rotor in the compressor motor shown in FIG. 1. The rotor 40 shown in FIG. 1 and FIG. 2 includes a rotor core 41, and permanent magnets 42 each inserted in a corresponding one of magnet insertion holes 41m of the rotor core 41. The rotor core 41 includes a shaft insertion hole 41CL in which the rotary shaft 3a of the crank shaft 3 is inserted. The shaft insertion hole 41CL has an inner diameter smaller than the outer diameter of the crank shaft 3, and the rotor core 41 is, for example, shrink-fitted or press-fitted to the rotary shaft 3a of the crank shaft 3.

Figure 3:
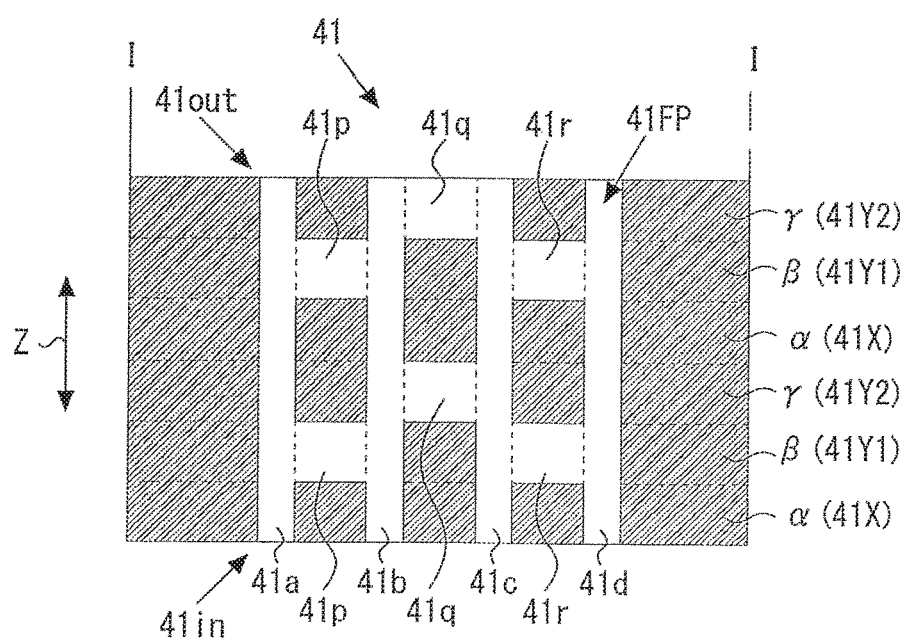
FIG. 3 is a cross-sectional view of a rotor core of the rotor shown in FIG. 2, taken along a line I-I.

FIG. 3 is a cross-sectional view of a rotor core of the rotor shown in FIG. 2, taken along a line I-I. The rotor core 41 shown in FIG. 1 to FIG. 3 includes the plurality of magnet insertion holes 41m in which the permanent magnets 42 are inserted, a flow path 41FP formed on the radially inner side of the plurality of magnet insertion holes 41m and through which a fluid (for example, gas refrigerant) flows, and the shaft insertion hole 41CL opened on the radially inner side of the flow path 41FP and in which the rotary shaft 3a is inserted. The same number of magnet insertion holes 41m as the number of magnetic poles N (even number equal to or larger than 4, for example, N=6) are provided, and the permanent magnet 42 is inserted in each of the plurality of magnet insertion holes 41m.

The flow path 41FP introduces, for example, the gas refrigerant discharged from the compression element 10 to the upper region in the sealed container 2, and also allows the gas refrigerant and a refrigerating machine oil guided to the upper region of the sealed container 2 to drop to the lower region in the sealed container 2. The flow path 41FP also serves to improve the heat dissipation performance of the rotor core 41, by allowing the refrigerant to flow through the flow path 41FP. A passage communicating between the upper region and the lower region of the sealed container 2 is formed between the sealed container 2 and the stator 30, to provide the same functions as those of the flow path 41FP.

Figure 7:
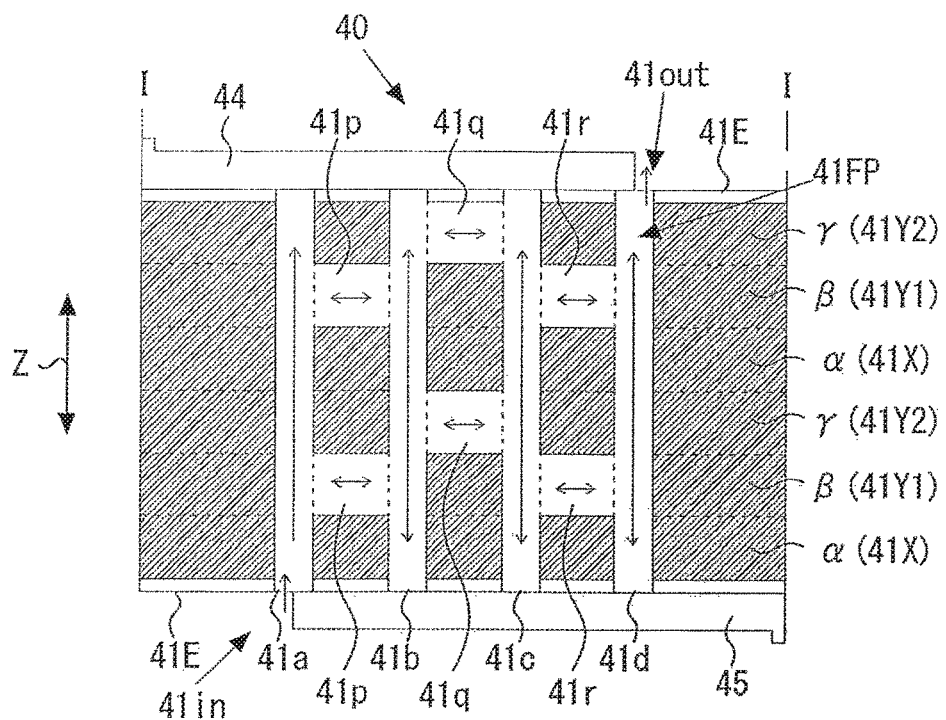
FIG. 7 is a cross-sectional view showing how refrigerant flows in the rotor shown in FIG. 3.

The rotor 40 shown in FIG. 1 includes end plates 41E each provided on a corresponding one of the end portions of the rotor core 41 in the axial direction (direction of the arrow Z), to prevent the permanent magnets 42 from flying out when the motor is driven, and counterweights 44 and 45 each fixed to a corresponding one of the end plates 41E to stabilize the driving torque (see FIG. 7). Although the end plates 41E and the counterweights 44 and 45 are separate components in this example, these components may be integrally formed. The counterweights 44 and 45 are each fixed to the rotor core 41 with a rivet 48.

As shown in FIG. 3, the rotor core 41 includes inlet openings 41in and outlet openings 41out each provided on a corresponding one of the end portions of the flow path 41FP in the axial direction (direction of the arrow Z), and communication holes 41p, 41r, and 41q each circumferentially extending inside the rotor core 41 and communicating with the inlet openings 41in and the outlet openings 41out. The rotor core 41 is formed by stacking a plurality of rotor core sheets each made of a thin electromagnetic steel plate punched into a predetermined shape. The inlet openings 41in, the outlet openings 41out, and the communication holes 41p, 41r, and 41q are opened by holes punched in the electromagnetic steel plates.

More specifically, the plurality of electromagnetic steel plates include perforated electromagnetic steel plates 41X and slotted electromagnetic steel plates 41Y1 and 41Y2. The perforated electromagnetic steel plate 41X and the slotted electromagnetic steel plates 41Y1 and 41Y2 are each formed by stacking a predetermined number of plates and, for example, stacked in the order of a block α composed of the perforated electromagnetic steel plates 41X, a block β composed of the slotted electromagnetic steel plates 41Y1, and a block γ composed of the slotted electromagnetic steel plate 41Y2. The block α of the perforated electromagnetic steel plates 41X, the block β of the slotted electromagnetic steel plates 41Y1, and the block γ of the slotted electromagnetic steel plates 41Y2 are stacked to allow communication among through holes 41a to 41f and the communication holes 41p, 41q, and 41r in the axial direction (direction of the arrow Z). In addition, the block β of the slotted electromagnetic steel plates 41Y1 and the block γ of the slotted electromagnetic steel plates 41Y2 are stacked to allow communication among the communication holes 41p, 41q, and 41r in the axial direction (direction of the arrow Z).

Figure 4:
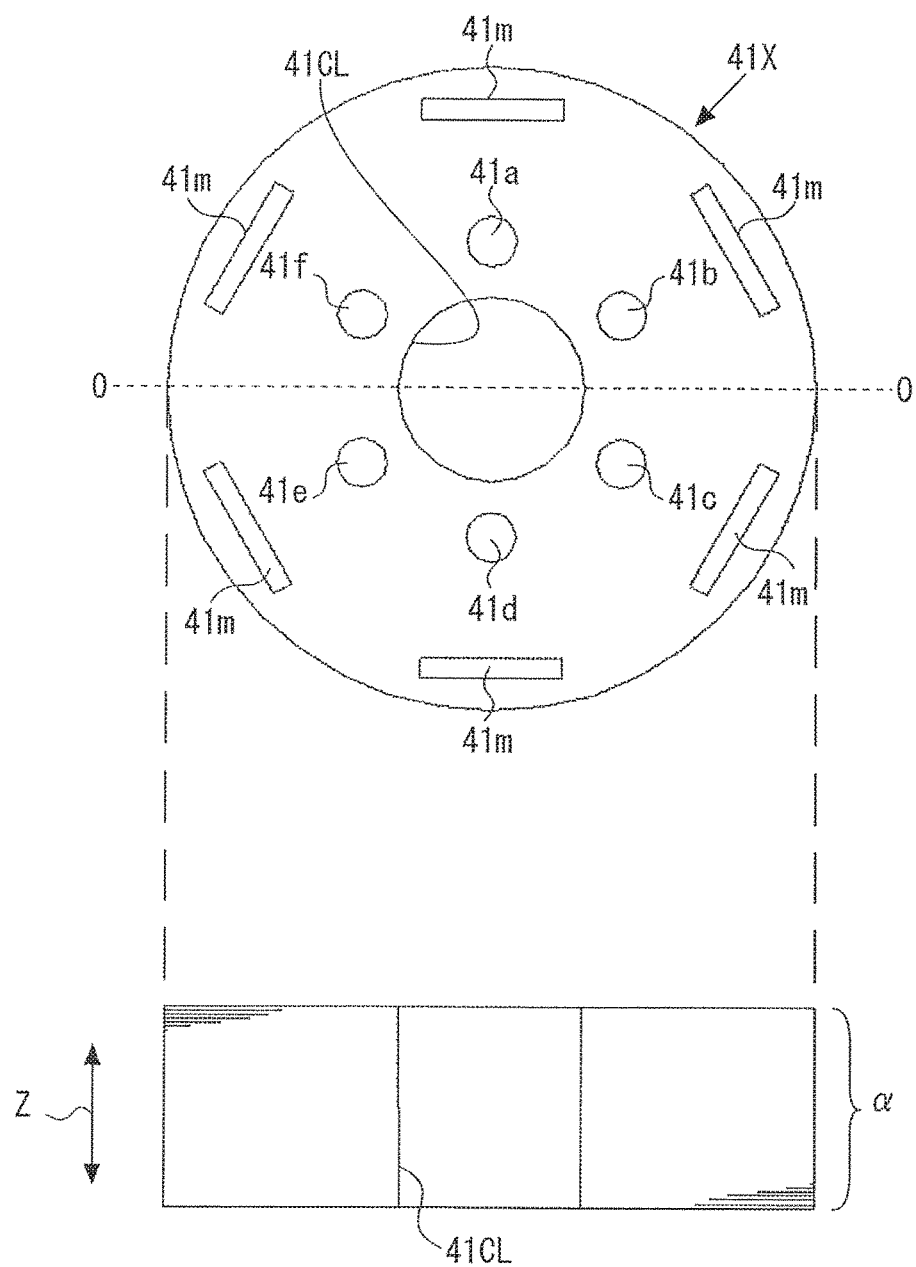
FIG. 4 includes a plan view showing an example of a perforated electromagnetic steel plate shown in FIG. 3, and a cross-sectional view taken along a line O-O.

FIG. 4 includes a plan view showing an example of the perforated electromagnetic steel plate shown in FIG. 3, and a cross-sectional view taken along a line O-O. The perforated electromagnetic steel plate 41X shown in FIG. 4 has the plurality of magnet insertion holes 41m in each of which the permanent magnet 42 is inserted, and the number of magnet insertion holes 41m is the same as the number N of the magnetic poles. The perforated electromagnetic steel plate 41X has the plurality of through holes 41a to 41f opened on the radially inner side of the magnet insertion holes 41m that open through the perforated electromagnetic steel plate 41X in the axial direction (direction of the arrow Z). FIG. 4 illustrates an example in which six through holes 41a to 41f are opened about the center of rotation at intervals of (360/N) degrees=60 degrees.

The through holes 41a to 41f are each opened in a circular shape for example, and serve as a flow path for allowing the refrigerant to flow through in the axial direction (direction of the arrow Z). The shape of the through holes 41a to 41f is not specifically limited as long as the through holes 41a to 41f are opened through the rotor core 41 in the axial direction, and the shape of the through holes 41a to 41f may be, for example, a polygonal shape or an elliptical shape. The openings of the plurality of through holes 41a to 41f of the perforated electromagnetic steel plate 41X provided on one of the end faces of the rotor core 41 in the axial direction each constitute the inlet openings 41in of the flow path 41FP.

Figure 5:
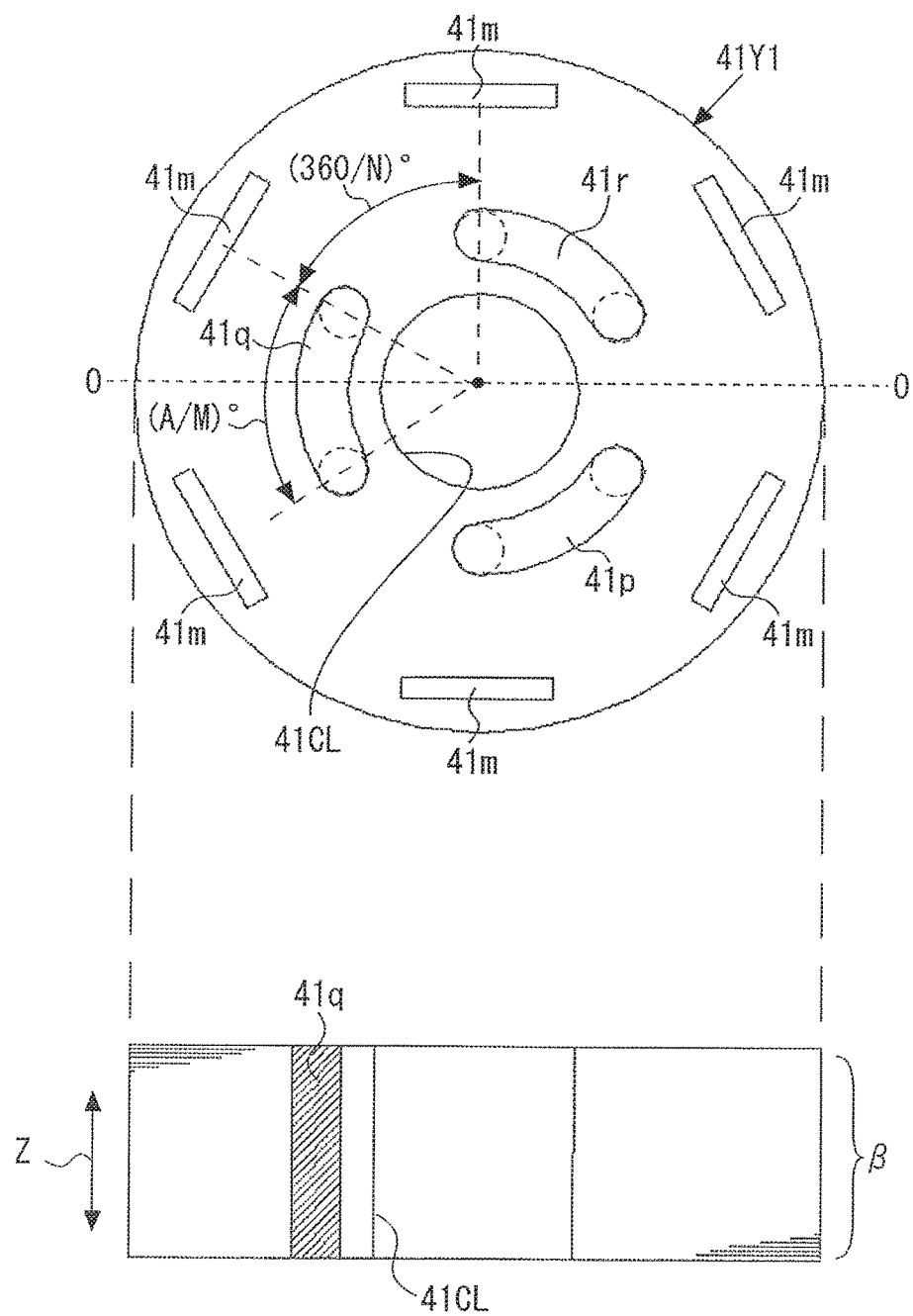
FIG. 5 includes a plan view showing an example of a slotted electromagnetic steel plate shown in FIG. 3, and a cross-sectional view taken along the line O-O.
Figure 6:
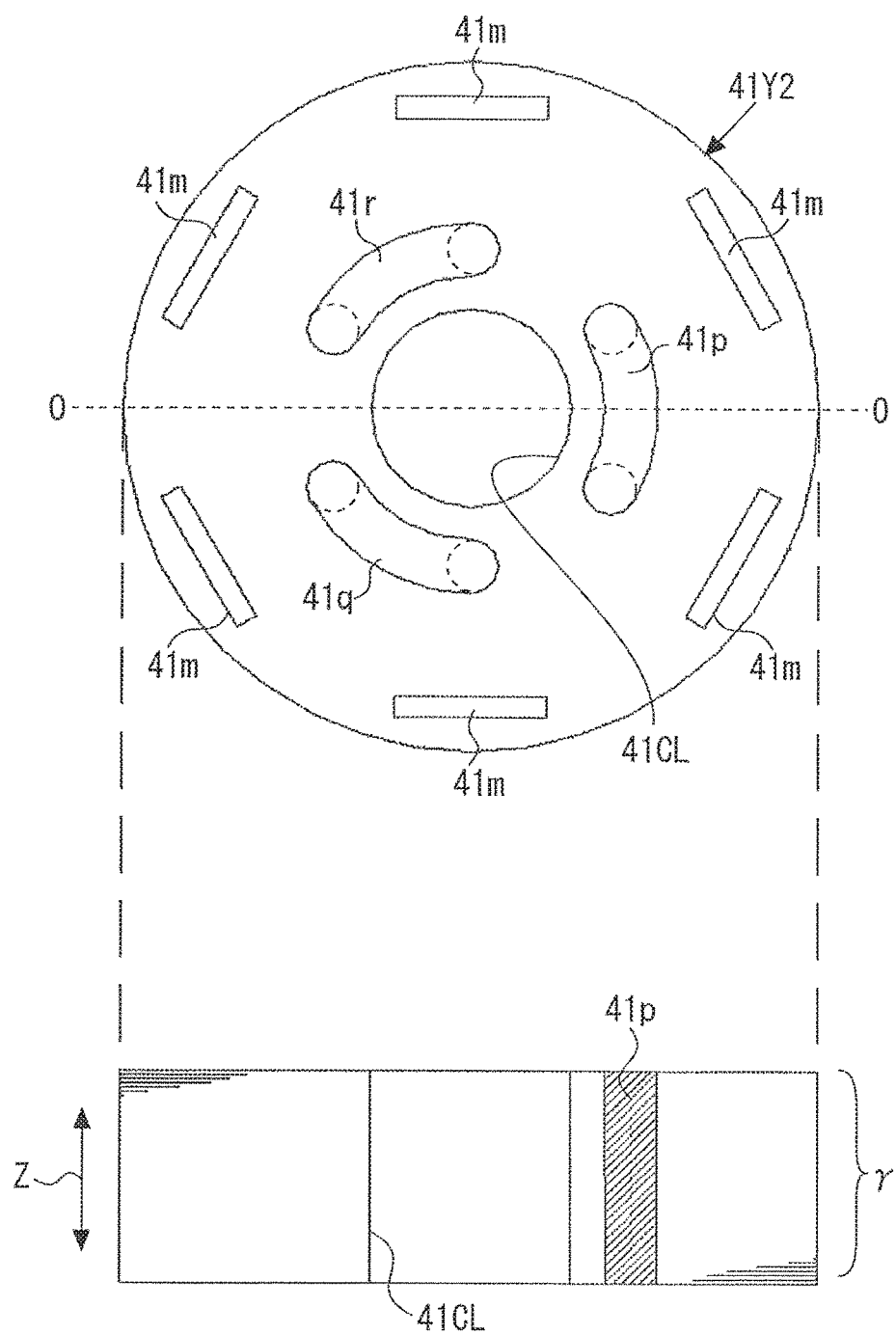
FIG. 6 includes a plan view showing another example of the slotted electromagnetic steel plate shown in FIG. 3, and a cross-sectional view taken along the line O-O.

FIG. 5 and FIG. 6 each include a plan view showing an example of the slotted electromagnetic steel plate shown in FIG. 3, and a cross-sectional view taken along the line O-O. The slotted electromagnetic steel plates 41Y1 and 41Y2 shown in FIG. 5 and FIG. 6 have the same shape, and are phase-shifted from each other by a predetermined angle (for example, 180 degrees) about the rotary shaft 3a. The slotted electromagnetic steel plates 41Y1 and 41Y2 include the plurality (for example, three) of communication holes 41p, 41q, and 41r extending in the circumferential direction. The openings of the plurality of communication holes 41p, 41q, and 41r of the slotted electromagnetic steel plate 41Y2 shown in FIG. 3, provided on the other end face of the rotor core 41 in the axial direction, each constitute the outlet opening 41out of the flow path 41FP.

The perforated electromagnetic steel plates 41X and the slotted electromagnetic steel plates 41Y1 and 41Y2 are each formed in a position and a size that allows, when the positions of the magnet insertion holes 41m are aligned, the through holes 41a to 41f and the communication holes 41p, 41q, and 41r to communicate with one another. In other words, when the slotted electromagnetic steel plates 41Y1 and 41Y2 are phase-shifted in the circumferential direction by a multiple of (360/N) degrees about the center of rotation, the positions of the magnet insertion holes 41m are aligned. To form the flow path 41FP with the mentioned phase shift, the through holes 41a to 41f and the communication holes 41p, 41q, and 41r have to be in communication with one another.

The communication holes 41p, 41q, and 41r can be expressed as the following expression (1) that satisfies the condition that allows the through holes 41a to 41f and the communication holes 41p, 41q, and 41r to communicate with one another when the perforated electromagnetic steel plates 41X and the slotted electromagnetic steel plates 41Y1 and 41Y2 are stacked and the positions of the magnet insertion holes 41m are aligned.

[Math. 1]

$$\frac{360}{N} \times M \leq A < \frac{360}{N} \times (M+1) \qquad (1)$$

In the expression (1) above, N denotes the number of magnetic poles (even number equal to or larger than 4), M denotes an integer representing the number of communication holes that satisfies the expression of M<N, and A denotes the total sum of the formation angle of the plurality of communication holes. Thus, the expression (1) represents that a length of the total angle A of the plurality of communication holes 41p, 41q, and 41r corresponds to a range equal to or larger than M poles and smaller than (M+1) poles when the pitch between the magnet insertion holes 41m is (360/N) degrees. When the total angle A is smaller than (360/N) degrees×M and the slotted electromagnetic steel plates 41Y1 and 41Y2 are rotated to shift the phase to align the positions of the magnet insertion holes 41m, the communication holes 41p, 41q, and 41r of the slotted electromagnetic steel plates 41Y1 and 41Y2 are unable to communicate with one another.

The slotted electromagnetic steel plate 41Y1 of FIG. 5 having the communication holes 41p, 41q, and 41r that satisfy the expression (1) turns into the slotted electromagnetic steel plate 41Y2 of FIG. 6 when the slotted electromagnetic steel plate 41Y1 is phase-shifted by rotation by M times of (360/N) degrees, which is the pitch between the magnet insertion holes 41m. Then the block β of the slotted electromagnetic steel plates 41Y1 and the block γ of the slotted electromagnetic steel plates 41Y2 are stacked as shown in FIG. 3. In other words, (N/M) types of phase-shifted slotted electromagnetic steel plates 41Y1 and 41Y2 are stacked. Subsequently, the communication holes 41p, 41q, and 41r of the slotted electromagnetic steel plates 41Y1 and 41Y2 of different phases overlap in a range not larger than (360/N) degrees, and thus the flow path 41FP communicating between the slotted electromagnetic steel plates 41Y1 and the slotted electromagnetic steel plates 41Y2 is formed.

In more detail, the slotted electromagnetic steel plates 41Y1 and 41Y2 shown in FIG. 5 and FIG. 6 are in the case where the number of magnetic poles N is 6, the integer M (number of communication holes) is 3, and the total angle A is 180 degrees, and the slotted electromagnetic steel plate 41Y1 includes slots each circumferentially extending by (A/M) degrees about the rotary shaft 3a and opened at intervals of (360/N) degrees. Thus, the slotted electromagnetic steel plate 41Y1 includes the communication holes 41p, 41q, and 41r each circumferentially extending by (A/M) degrees=180 degrees/3=60 degrees and opened at intervals of (360/N) degrees=360/6=60 degrees. In FIG. 5 and FIG. 6, the communication holes 41p, 41q, and 41r are opened wide in a range larger than 60 degrees by a predetermined angle, and (N/M)=(6/3)=2 types (digits after decimal point rounded up) of plates, namely the slotted electromagnetic steel plates 41Y1 and the slotted electromagnetic steel plate 41Y2 phase-shifted by (360/N) degrees×M=(360/6)×3=180 degrees are stacked.

FIG. 7 is a cross-sectional view showing how the refrigerant flows in the rotor shown in FIG. 3. As shown in FIG. 7, the area of the flow path 41FP is increased because the flow path 41FP circumferentially extends inside the rotor 40 about the rotary shaft 3a, and hence the heat dissipation performance can be improved. Consequently, the temperature of the permanent magnet 42 can be decreased, and hence the magnetic flux amount and the demagnetization resistance of the permanent magnet, which are dependent on temperature, can be improved.

Figure 8:
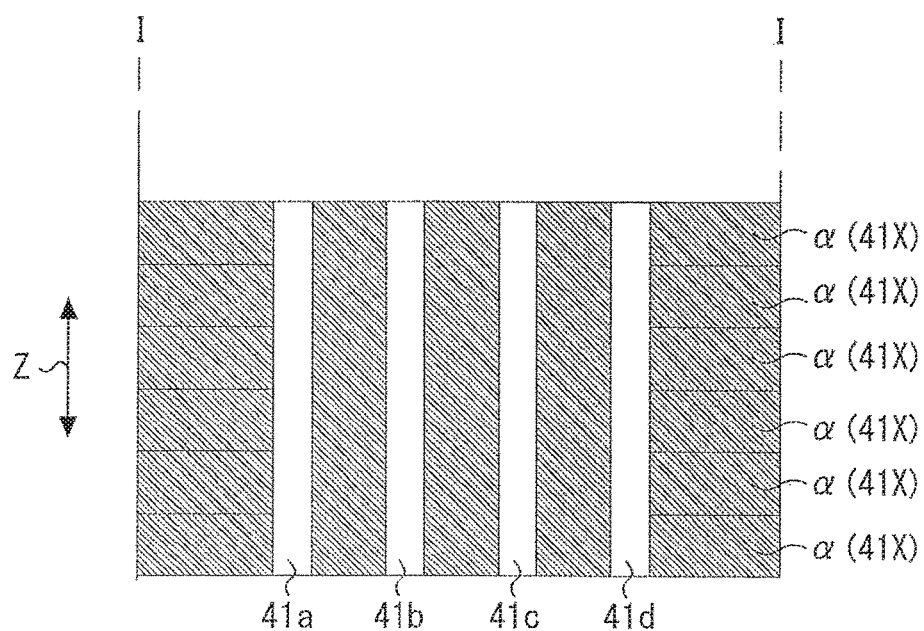
FIG. 8 is a cross-sectional view taken along the line I-I, showing a rotor core of a conventional rotor.

FIG. 8 is a cross-sectional view taken along the line I-I, showing a rotor core of a conventional rotor. The conventional rotor core shown in FIG. 8 consists only of the blocks α each composed of the perforated electromagnetic steel plates 41X having refrigerant flow paths formed only in the axial direction (direction of the arrow Z). In other words, the refrigerant flow paths are formed to linearly open through the rotor core in the axial direction (direction of the arrow Z). In this case, the surface area of the refrigerant flow path is small, and consequently a level of the heat dissipation performance is difficult to be attained that enables to prevent or reduce the decline in demagnetization resistance of the permanent magnet.

As another method to increase the surface area of the flow path to thereby improve the heat dissipation performance, uneven surface may be formed on the refrigerant flow path. Alternatively, the number of refrigerant flow paths running in the axial direction may be increased, or the refrigerant flow paths may be formed in the radial direction, in addition to the refrigerant flow paths formed in the axial direction, to increase the refrigerant flow path. However, in the case where the refrigerant flow path is formed in the vicinity of the magnet insertion hole or on the outer side of the magnet insertion hole, the magnetic path of the electromagnetic steel plate is decreased and hence the magnetic flux density is increased. Consequently, the electromagnetic steel plate may be magnetically saturated or the attraction and repulsion between the rotating magnetic field generated by the stator and the rotor magnet may become unbalanced, which may degrade performance or increase noise. In contrast, as the rotor 40 shown in FIG. 3 has the flow path 41FP formed in the circumferential direction, the effective surface area can be increased, compared with the conventional rotor 40 shown in FIG. 8.

Further, as the rotor core 41 includes the perforated electromagnetic steel plates 41X each having the plurality of through holes 41a to 41f opening through the perforated electromagnetic steel plates 41X in the axial direction, in addition to the slotted electromagnetic steel plates 41Y1 and 41Y2, the thickness of the rotor 40 in the axial direction (direction of the arrow Z) can be adjusted, with an increase in effective surface area of the flow path.

At this time, a case is assumed where one of the perforated electromagnetic steel plates 41X is provided on one of the end faces of the rotor core 41 in the axial direction (direction of the arrow Z) and the plurality of through holes 41a to 41f all communicate with one of the communication holes 41p, 41q, and 41r. Even if the counterweight 44 or 45 covers any of the inlet openings 41in (through holes 41a to 41f) (see FIG. 7), the refrigerant can flow into the flow path through at least one of the communication holes, from uncovered one or more of through holes. Consequently, a decrease in effective surface area of the flow path owing to the covering of the refrigerant inlet openings provided on the end face of the rotor 40 can be prevented or reduced.

Figure 9:
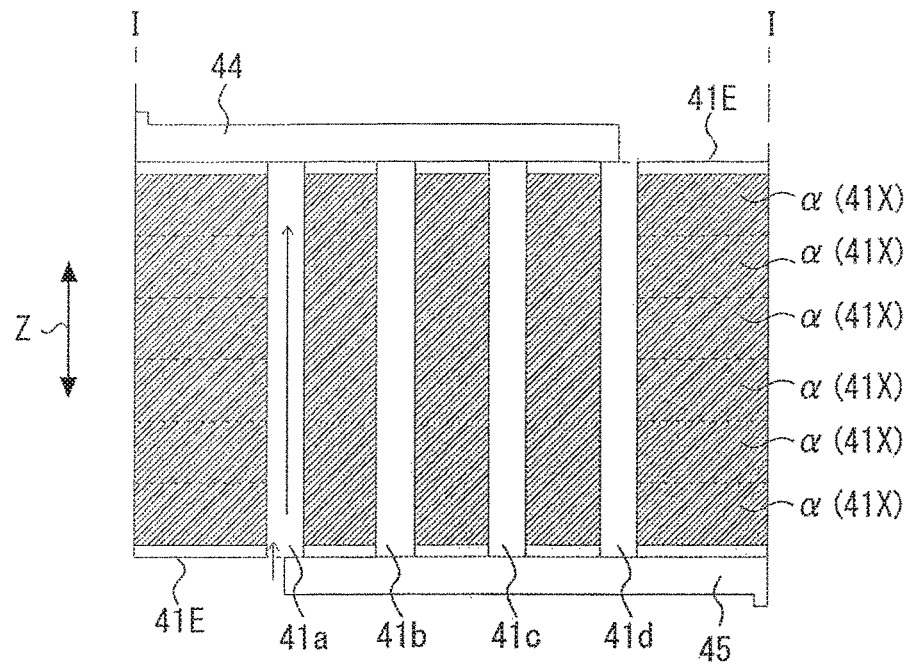
FIG. 9 is a cross-sectional view showing the conventional rotor of FIG. 8 with counterweights attached.

More specifically, FIG. 9 is a cross-sectional view showing the conventional rotor of FIG. 8 with counterweights attached. In the case where the end plates 41E and the counterweights 44 and 45 are attached to the rotor as shown in FIG. 9, one or more of the plurality of flow paths are covered. The refrigerant does not flow into the covered one or more of the flow paths, and then the effective surface area of the flow path is decreased.

In contrast, in the case of the rotor 40 shown in FIG. 7, with the end plates 41E and the counterweights 44 and 45 attached to the end faces of the iron core of the rotor 40, even if any of the inlet openings 41in (through holes 41a to 41f) or the outlet openings 41out (through holes 41a to 41f) are covered with the counterweights 44 and 45, the refrigerant can flow though the entirety of the flow path 41FP from the remaining uncovered one or more of inlet openings 41in or the remaining uncovered one or more of the outlet openings 41out. Consequently, the effective surface area of the flow path 41FP can be increased, and the heat dissipation performance of the rotor 40 can be improved.

Further, in the case where the communication holes are opened to set the total angle A to satisfy the expression (1), the communication holes 41p, 41q, and 41r of the slotted electromagnetic steel plates 41Y1 and 41Y2 can be reliably communicated with one another, when the plurality of slotted electromagnetic steel plates 41Y1 and 41Y2 are stacked by a phase difference to align the positions of the magnet insertion holes 41m.

Embodiment 2

Figure 10:
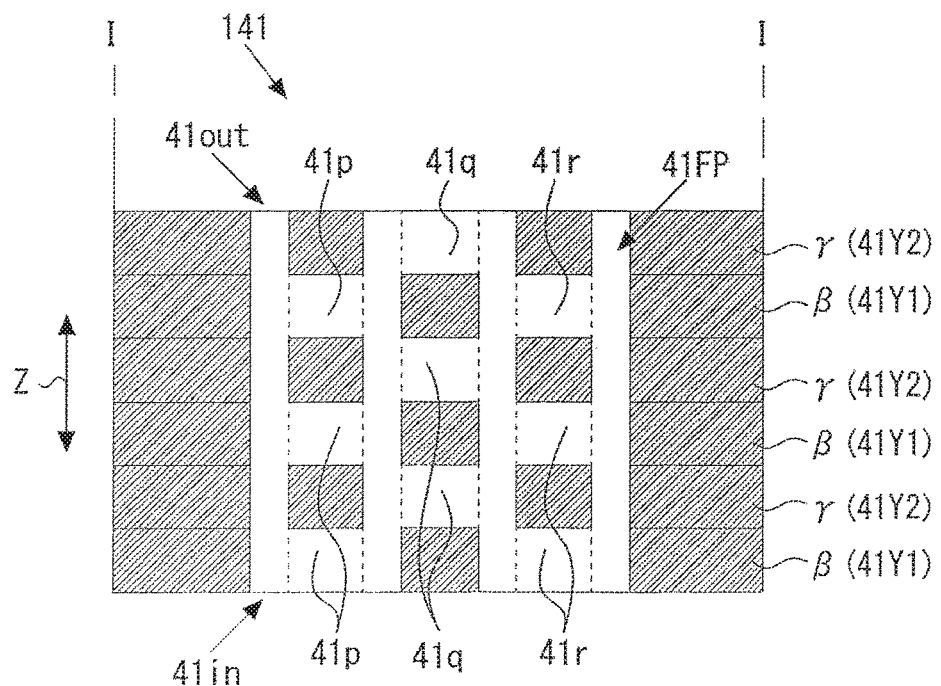
FIG. 10 is a cross-sectional view taken along the line I-I, showing a rotor core of a motor according to Embodiment 2 of the present invention.
Figure 11:
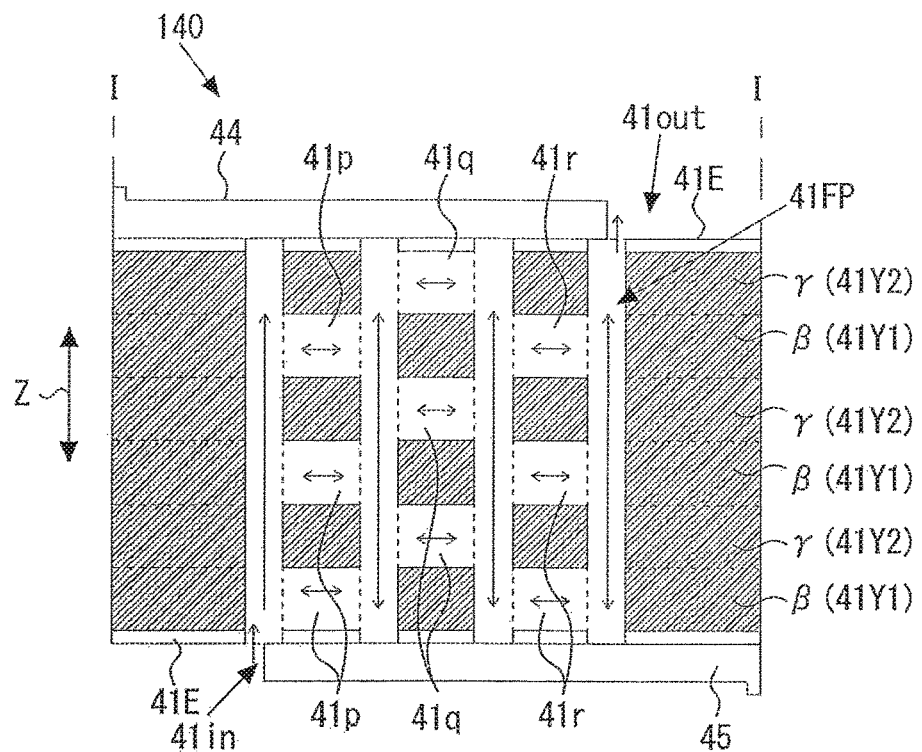
FIG. 11 is a cross-sectional view taken along the line I-I, showing the rotor core of FIG. 10 with an end plate and the counterweights attached.

FIG. 10 is a cross-sectional view taken along the line I-I, showing a rotor core of a motor according to Embodiment 2 of the present invention, and FIG. 11 is a cross-sectional view taken along the line I-I, showing the rotor core of FIG. 10 with the end plates and the counterweights attached. With reference to FIG. 10 and FIG. 11, a rotor 140 will be described. In the rotor 140 shown in FIG. 10 and FIG. 11, the same components as those of the rotor 40 shown in FIG. 3 are given the same reference signs, and the description of the same components will not be repeated. The rotor 140 of FIG. 10 is different from the rotor 40 of FIG. 3 in that the flow path 41FP is constituted only of the slotted electromagnetic steel plates 41Y1 and 41Y2, without the perforated electromagnetic steel plates 41X.

As shown in FIG. 10 and FIG. 11, the rotor 140 is formed by alternately stacking the slotted electromagnetic steel plates 41Y1 and 41Y2. In other words, (N/M) types (digits after decimal point rounded up) of the slotted electromagnetic steel plates 41Y1 are stacked by a phase difference of (360/N) degrees×M about the center of rotation. In this case, the communication holes 41p, 41q, and 41r of the stacked slotted electromagnetic steel plates 41Y1 and 41Y2 communicate with one another in the axial direction, and the flow path 41FP is formed with stepped portions to generally helically extend in the circumferential direction.

When the end plates 41E and the counterweights 44 and 45 are attached to the end faces of the rotor core 141 in the axial direction, one or more of the communication holes 41r, 41p, and 41q of one of the slotted electromagnetic steel plates 41Y1 at the end face are covered with the counterweight 44 or 45. However, as the slotted electromagnetic steel plates 41Y1 and 41Y2 include the plurality of communication holes 41r, 41p, and 41q, the refrigerant can flow into the entirety of the flow path 41FP through uncovered one or more of the inlet openings 41in (communication holes 41p, 41q, and 41r) and flow out through uncovered one or more of the outlet openings 41out (communication holes 41p, 41q, and 41r), of the slotted electromagnetic steel plates 41Y1 and 41Y2 at the end face of the rotor.

With the configuration of Embodiment 2 also, as the rotor 40 has the flow path 41FP formed in the circumferential direction about the rotary shaft 3a as in Embodiment 1, the surface area of the flow path 41FP is increased, and hence the heat dissipation performance can be improved. Consequently, the temperature of the permanent magnet 42 can be decreased. Further, even if the counterweights 44 and 45 are attached, the refrigerant can flow through the entirety of the flow path formed in the rotor 140, and consequently the effective surface area of the flow path can be increased compared with the conventional rotor (see FIG. 8).

Embodiment 3

FIG. 12 to FIG. 17 are plan views each showing an example of a rotor core according to Embodiment 3 of the present invention. With reference to FIG. 12 to FIG. 17, rotor cores 241, 341, and 441 will be described. In the rotor cores 241, 341, and 441 shown in FIG. 12 to FIG. 17, the same components as those of the rotor core 41 of Embodiment 1 are given the same reference signs, and the description of the same components will not be repeated. The rotor cores 241, 341, and 441 shown in FIG. 12 to FIG. 17 are different from the rotor core 41 of Embodiment 1 in the number of magnetic poles N, the integer M, and the total angle A.

Figure 12:
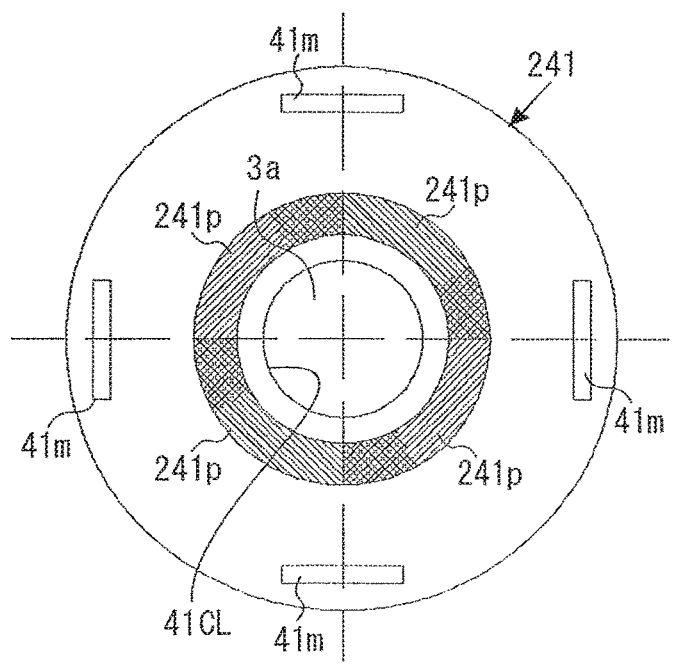
FIG. 12 is a plan view showing an example of a rotor core according to Embodiment 3 of the present invention.
Figure 13:
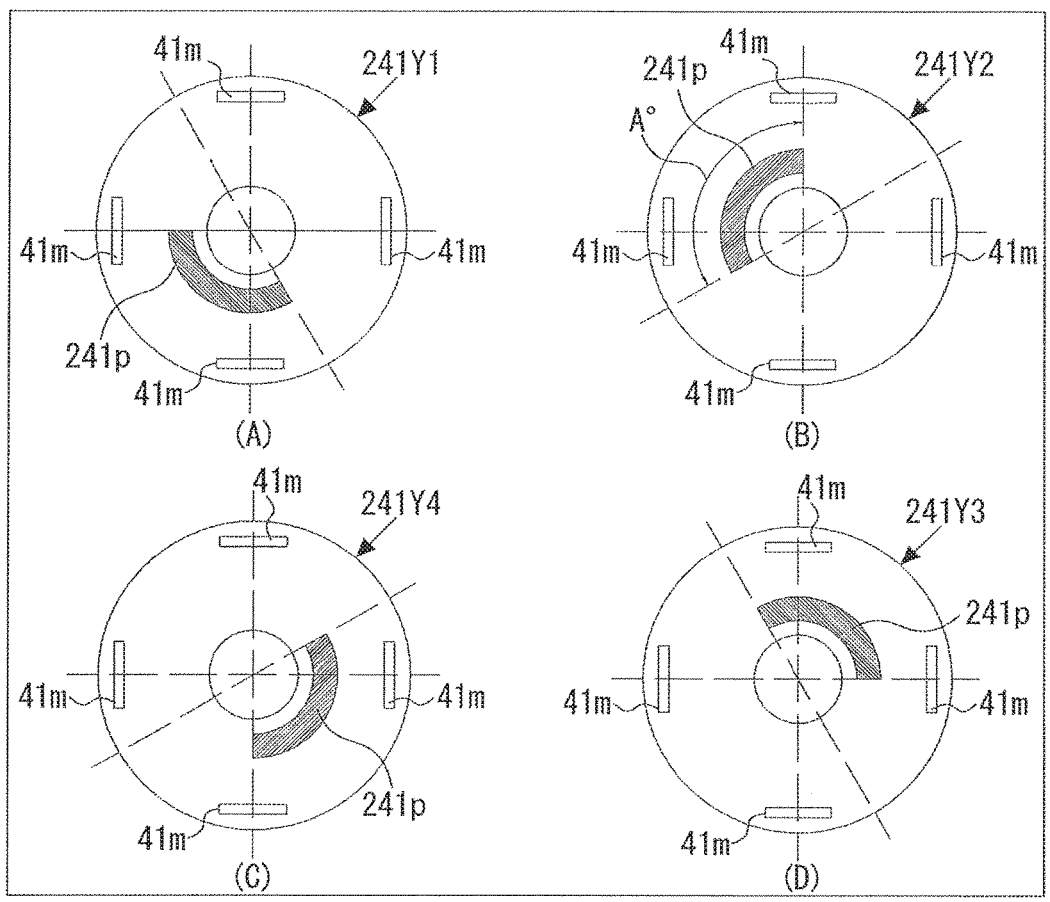
FIG. 13 includes plan views showing the example of the rotor core according to Embodiment 3 of the present invention.

In slotted electromagnetic steel plates 241Y1 to 241Y4 of the rotor core 241 shown in FIG. 12 and FIG. 13, the number of magnetic poles N is 4, the integer M (number of communication holes) is 1, and the total angle A of the communication holes 241p that satisfies the expression (1) is 120 degrees. As the integer M is 1, the angular range A/M in which each of the communication holes 241p is opened is 120 degrees. In addition, as illustrated in (A) to (D) of FIG. 13, the slotted electromagnetic steel plates 241Y1 are sequentially stacked by a phase difference of 360/N× M=360/4×1=90 degrees about the rotary shaft 3a. In other words, the rotor core 241 is composed of N/M=4 types of slotted electromagnetic steel plates 241Y1 to 241Y4, stacked by the mentioned phase difference.

Figure 14:
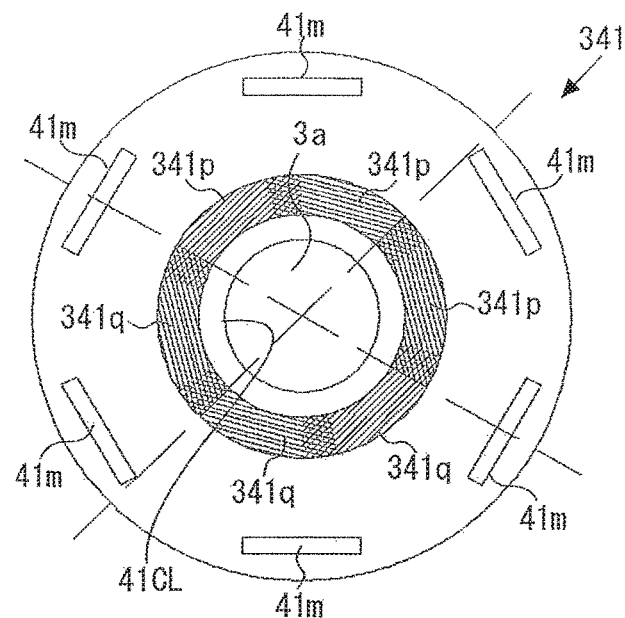
FIG. 14 is a plan view showing still another example of the rotor core according to Embodiment 3 of the present invention.
Figure 15:
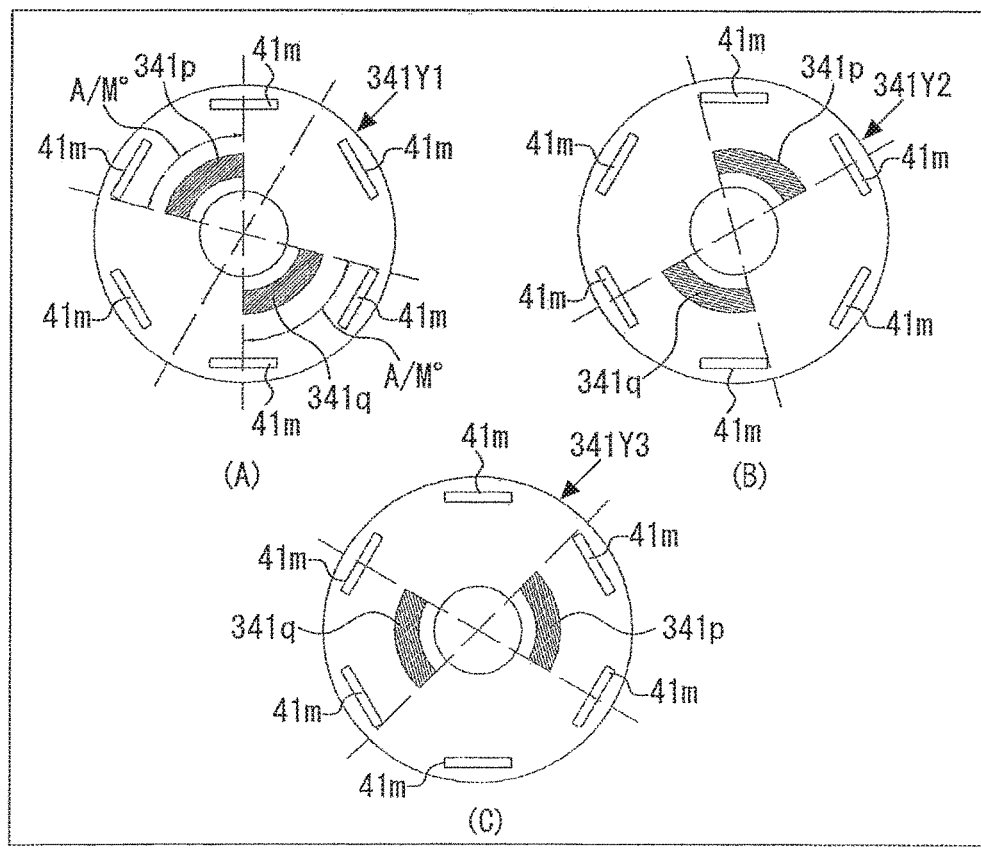
FIG. 15 includes plan views showing the example of the rotor core according to Embodiment 3 of the present invention.

In slotted electromagnetic steel plates 341Y1 to 341Y3 of the rotor core 341 shown in FIG. 14 and FIG. 15, the number of magnetic poles N is 6, the integer M (number of communication holes) is 2, and the total angle A of the communication holes 341p that satisfies the expression (1) is 150 degrees. As the integer M is 2, the angular range A/M in which each of the communication holes 241p is opened is 75 degrees. In addition, as illustrated in (A) to (C) of FIG. 15, the slotted electromagnetic steel plates 341Y1 are sequentially stacked by a phase difference of (360/N) degrees× M=360/6×2=120 degrees about the rotary shaft 3a. In other words, the rotor core 341 is composed of N/M=3 types of slotted electromagnetic steel plates 341Y1 to 341Y3, stacked by the mentioned phase difference.

Figure 16:
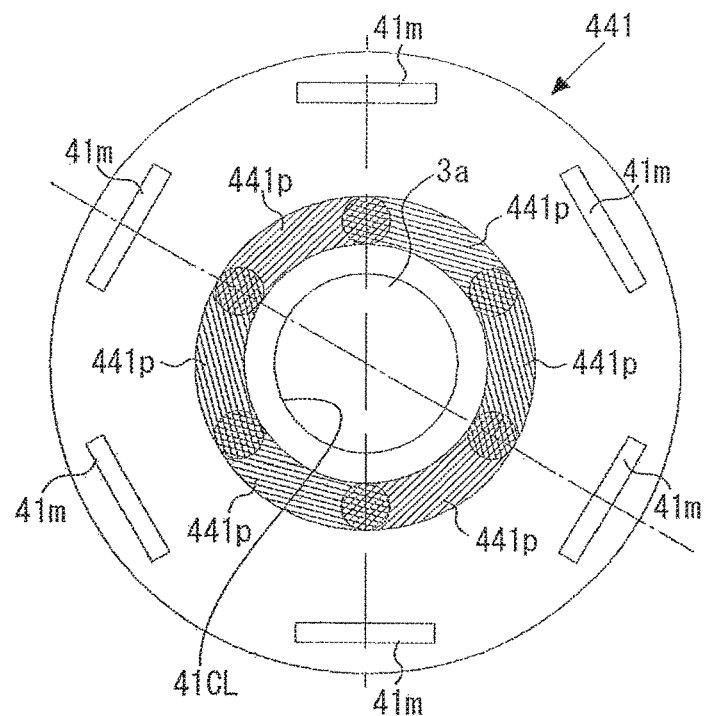
FIG. 16 is a plan view showing still another example of the rotor core according to Embodiment 3 of the present invention.
Figure 17:
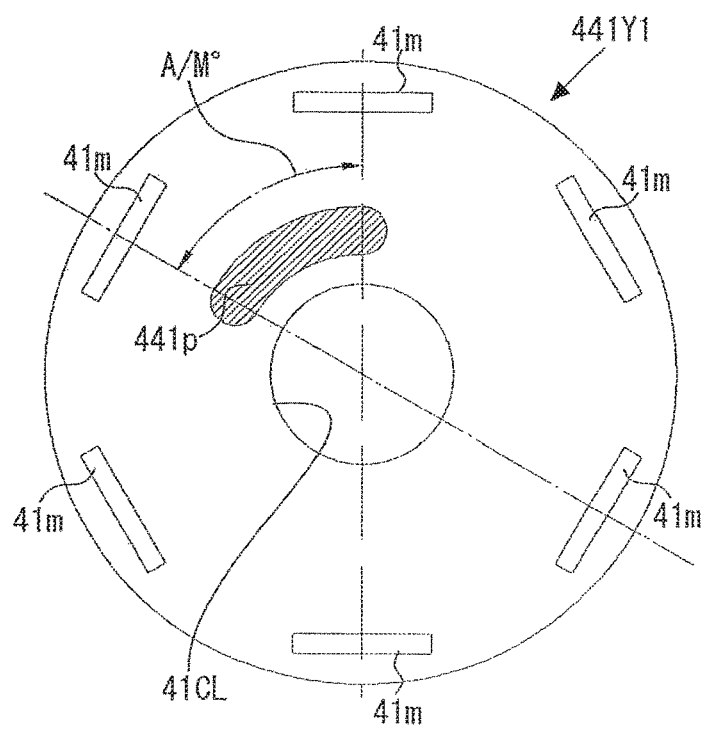
FIG. 17 includes plan views showing the example of the rotor core according to Embodiment 3 of the present invention.

In slotted electromagnetic steel plates 441Y1 of the rotor core 441 shown in FIG. 16 and FIG. 17, the number of magnetic poles N is 6, the integer M (number of communication holes) is 1, and the total angle A of the communication holes 441p that satisfies the expression (1) is 60 degrees. As the integer M is 1, the angular range A/M in which each of the communication holes 441p is opened is 60 degrees. As in Embodiment 1, the communication hole 441p is opened wide in a range larger than 60 degrees by a predetermined angle, to allow the communication hole 441p of the slotted electromagnetic steel plate 441Y1 to communicate with the communication hole 441p of another slotted electromagnetic steel plate. In addition, as shown in FIG. 17, the slotted electromagnetic steel plates 441Y1 are sequentially stacked by a phase difference of 360/N×M=360/6× 1=60 degrees about the rotary shaft 3a. In other words, the rotor core 441 is composed of N/M=6 types of slotted electromagnetic steel plates 441Y1, stacked by the mentioned phase difference.

With the configuration of Embodiment 3 also, as the rotor cores 241, 341, and 441 each include the flow path 41FP formed in the circumferential direction about the rotary shaft 3a as in Embodiment 1, the surface area of the flow path 41FP is increased, and hence the heat dissipation performance can be improved. Consequently, the temperature of the permanent magnet 42 can be decreased. Further, even if the counterweights 44 and 45 are attached, the refrigerant can flow through the entirety of the flow path formed in each of the rotor cores 241, 341, and 441, and consequently the effective surface area of the flow path can be increased compared with the conventional rotor (see FIG. 8).

Although FIG. 12 to FIG. 17 illustrate the cases where the slotted electromagnetic steel plates 241Y1 to 241Y4, 341Y1 to 341Y3, and 441Y1 are stacked, the perforated electromagnetic steel plates 41X may be interposed as in Embodiment 1. Alternatively, as in Embodiment 2, only the slotted electromagnetic steel plates 241Y1 to 241Y4, 341Y1 to 341Y3, and 441Y1 may be stacked without the perforated electromagnetic steel plates 41X.

Embodiment 4

Figure 18:
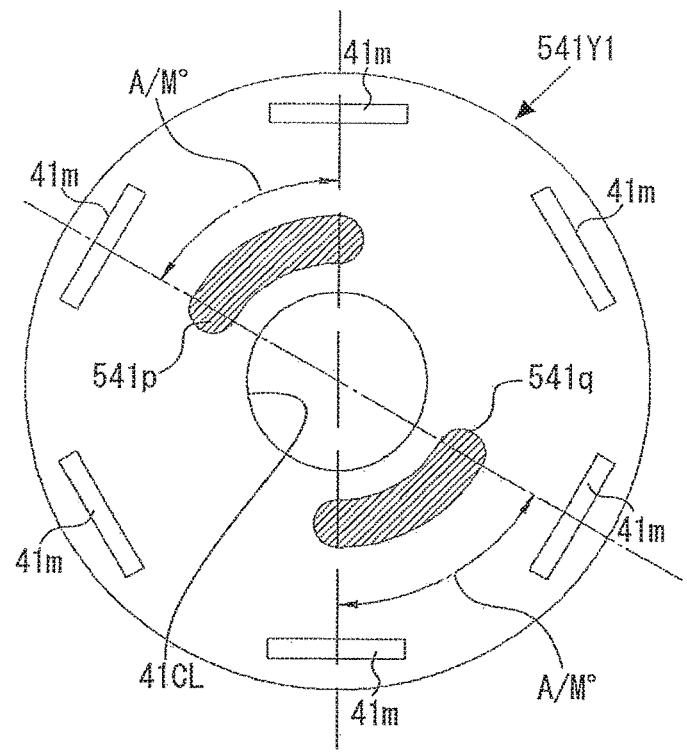
FIG. 18 is a plan view showing an example of a slotted electromagnetic steel plate of a rotor core according to Embodiment 4 of the present invention.
Figure 19:
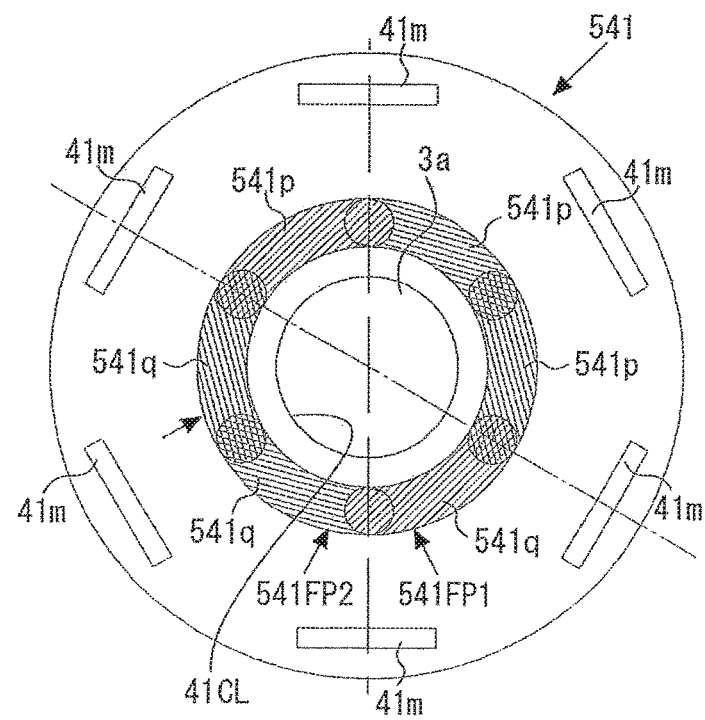
FIG. 19 is a plan view showing the rotor core including the slotted electromagnetic steel plate shown in FIG. 18.

FIG. 18 is a plan view showing an example of a slotted electromagnetic steel plate of a rotor core according to Embodiment 4 of the present invention. FIG. 19 is a plan view showing the rotor core including the slotted electromagnetic steel plate shown in FIG. 18. With reference to FIG. 18, a rotor core 541 will be described. In the rotor core 541 shown in FIG. 18, the same components as those of the rotor core 41 of Embodiment 1 are given the same reference signs, and the description of the same components will not be repeated. The rotor core 541 of FIG. 18 is different from the rotor core 41 of Embodiment 1 in that a plurality of flow paths 541FP1 and 541FP2 are formed.

To form the plurality of flow paths 541FP1 and 541FP2 in the rotor core 541, a condition that the integer M is equal to or smaller than (N/2)−1 and the integer M is equal to or larger than 2 is added to the condition that N is smaller than the integer M. In the slotted electromagnetic steel plate 541Y1 shown in FIG. 18 and FIG. 19, the number of magnetic poles N is 6, and the integer M is 2 (digits after decimal point rounded up), and two communication holes 541p and 541q are provided. The total angle A of the communication holes 541p and 541q that satisfies the expression (1) is set to 120 degrees. As the integer M is 2, the angular range A/M in which the communication hole 541p is opened is 60 degrees.

Such slotted electromagnetic steel plates 541Y1 are sequentially stacked by a phase difference of 360/N× M=360/6×2=120 degrees, about the rotary shaft 3a. In other words, the rotor core 541 is composed of N/M=3 types of slotted electromagnetic steel plates 541Y1, stacked by the mentioned phase difference. Thus, the two flow paths 541FP1 and 541FP2 independent from each other are formed. The two is the number of paths in each of the slotted electromagnetic steel plates 541Y1.

With the configuration of Embodiment 4 also, as the rotor core 541 includes the plurality of flow paths 541FP1 and 541FP2 formed in the circumferential direction about the rotary shaft 3a as in Embodiment 1, the surface area of the flow paths 541FP1 and 541FP2 is increased, and hence the heat dissipation performance can be improved. Consequently, the temperature of the permanent magnet 42 can be decreased. Further, in Embodiment 4 also, the perforated electromagnetic steel plates 41X may be interposed as in Embodiment 1.

The present invention is not limited to Embodiments described above. For example, although the sealed compressor 1 shown in FIG. 1 is assumed to be a single-cylinder compressor, the present invention is equally applicable to a dual-cylinder rotary compressor having a pair of compression elements 10. In addition, although the compression element 10 and the compressor motor 20 are aligned in the vertical direction (direction of the arrow Z) in the sealed compressor 1 shown in FIG. 1, the compression element 10 and the compressor motor 20 may be aligned in the horizontal direction. Further, although the sealed compressor shown in FIG. 1 is a rotary compressor, a different compression method such as scrolling and reciprocation may be adopted, as long as the motor is located inside the sealed container in the sealed compressor.

Still further, although Embodiments 1 to 4 represent the case where the slotted electromagnetic steel plates of the same shape are stacked by a phase difference, the communication holes are only required to communicate with each other in the circumferential direction, and the slotted electromagnetic steel plates of different shapes may be stacked. For example, in the case where two layered structures each composed of the blocks α, β, and γ as shown in FIG. 3 are provided, a set of the blocks β and γ may be composed of the slotted electromagnetic steel plates 41Y1 and 41Y2 shown in FIG. 4 and FIG. 5, and the other set of the blocks β and γ may be composed of the slotted electromagnetic steel plates 441Y1 shown in FIG. 16 and FIG. 17. In such a case, the flow path area can be varied in the axial direction when temperatures distributed on the rotor is uneven in the axial direction, and thus a flow path corresponding to the temperature characteristic of the rotor can be obtained.

The invention claimed is:

1. A motor rotor comprising
a rotor core formed of electromagnetic steel plates stacked in an axial direction of the rotor core, the rotor core having a plurality of magnet insertion holes in each of which a permanent magnet is inserted, a flow path formed on a radially inner side of the plurality of magnet insertion holes to allow a fluid to flow through, and a shaft insertion hole located on a radially inner side of the flow path in which a rotary shaft is inserted, the flow path circumferentially extends around the shaft insertion hole, wherein the rotor core having an inlet opening and an outlet opening of the flow path, which are each located on in a corresponding one of end faces of the rotor core in the axial direction, and the electromagnetic steel plates include slotted electromagnetic steel plates and perforated electromagnetic steel plates, the slotted electromagnetic steel plates include communication holes that extend circumferentially inside the rotor core and communicate with the inlet opening and the outlet opening of the flow path, the communication holes are formed to satisfy an expression of $360/N \times M \ A \leq 360/N \times (M+1)$ where N denotes the number of magnetic poles, M denotes the number of the communication holes (M<N), and A denotes a total of formation angles of the communication holes about the rotary shaft, the total of formation angles of the communication holes being a total arc length of the communication holes in degrees, and the rotor core includes the plurality of slotted electromagnetic steel plates of (N/M) layers, phase-shifted from each other by (360/N) degrees×M degrees in the circumferential direction to form a flow path that extends circumferentially around the shaft insertion hole.

2. The motor rotor of claim 1, wherein the slotted electromagnetic steel plates have the same shape, and are stacked by a phase difference of the communication holes in a circumferential direction about the rotary shaft, and the communication holes are shifted in the circumferential direction and communicating with each other.

3. The motor rotor of claim 1, wherein the number of the communication holes M satisfies M (N/2)−1, and the rotor core includes a plurality of the flow paths independent from each other.

4. The motor rotor of claim 1, wherein the rotor core includes the flow path having the communication holes of the plurality of slotted electromagnetic steel plates stacked on each other, the communication holes communicating with each other.

5. The motor rotor of claim 1, wherein the perforated electromagnetic steel plates each include the plurality of magnet insertion holes and a plurality of through holes opened on the radially inner side of the plurality of magnet insertion holes to open in the axial direction, and the perforated electromagnetic steel plates are stacked so that the plurality of through holes of the perforated electromagnetic steel plates communicate with the communication holes of the plurality of slotted electromagnetic steel plates.

6. The motor rotor of claim 5, wherein the perforated electromagnetic steel plates are each provided on a corresponding one of the end faces in the axial direction, and all of the plurality of through holes of the perforated electromagnetic steel plates provided on the end faces each communicate with the communication holes of the plurality of slotted electromagnetic steel plates.

7. A compressor motor comprising:

the motor rotor of claim 1; and a stator located along an outer circumference of the motor rotor and including a coil.

8. A compressor comprising:

the compressor motor of claim 7;

a crank shaft connected to the compressor motor and configured to be driven by the compressor motor to rotate; and a compression element connected to the crank shaft and configured to compress a fluid.

9. A compressor motor comprising:

the motor rotor of claim 1; and a stator located along an outer circumference of the motor rotor and including a coil.

10. A compressor comprising:

the compressor motor of claim 9;

a crank shaft connected to the compressor motor and configured to be driven by the compressor motor to rotate; and a compression element connected to the crank shaft and configured to compress a fluid.

11. The motor rotor according to claim 1, wherein each of the slotted electromagnetic steel plates includes through holes that each extend in a straight line parallel to the axial direction of the rotor core between the inlet opening and the outlet opening of the flow path, and the communication holes of the slotted electromagnetic steel plates extend circumferentially between two adjacent through holes to communicate the inlet opening and the outlet opening.

* * * * *